(12) United States Patent
Inoko (10) Patent No.: US 11,720,166 B2
(45) Date of Patent: Aug. 8, 2023

(54) VIDEO DISPLAY SYSTEM, VIDEO DISPLAY METHOD, AND COMPUTER PROGRAM

(71) Applicant: TEAMLAB INC., Tokyo (JP)

(72) Inventor: Toshiyuki Inoko, Tokyo (JP)

(73) Assignee: teamLab Inc., Tokyo (JP)

( * ) Notice: Subject to any disclaimer, the term of this patent is extended or adjusted under 35 U.S.C. 154(b) by 0 days.

(21) Appl. No.: 17/253,615

(22) PCT Filed: Feb. 27, 2019

(86) PCT No.: PCT/JP2019/007477
§ 371 (c)(1),
(2) Date: Dec. 17, 2020

(87) PCT Pub. No.: WO2019/244409
PCT Pub. Date: Dec. 26, 2019

(65) Prior Publication Data
US 2021/0263583 A1   Aug. 26, 2021

(30) Foreign Application Priority Data

Jun. 18, 2018   (JP) .................................. 2018-115602

(51) Int. Cl.
*G06F 3/01*   (2006.01)
*G06F 3/14*   (2006.01)
*G06T 15/20*   (2011.01)

(52) U.S. Cl.
CPC ................ *G06F 3/011* (2013.01); *G06F 3/14* (2013.01); *G06T 15/20* (2013.01)

(58) Field of Classification Search
CPC .. G06F 3/011; G06F 3/017; G06F 3/14; G06F 3/04815; G06F 3/0421;
(Continued)

(56) References Cited

U.S. PATENT DOCUMENTS

2020/0012421 A1*   1/2020   Kato .................... H04N 21/816

FOREIGN PATENT DOCUMENTS

EP          583060 A2 *   2/1994   ............. G06T 15/20
EP         0583060 A2     2/1994
(Continued)

OTHER PUBLICATIONS

International Search Report of International Patent Application No. PCT/JP2019/007477 completed May 17, 2019 and dated May 28, 2019 (4 pages).
(Continued)

*Primary Examiner* — Xuemei Zheng
(74) *Attorney, Agent, or Firm* — Pyprus Pte Ltd; George D. Liu (57) ABSTRACT

To provide a display system which changes a video in accordance with the position of a real object on a display screen, and which provides a strong sense of immersion and a strong sense of presence in a scene. A video display system 100 comprises: a rendering device 10 which generates a two-dimensional video as seen from a specific camera position; a display device 20 which displays the video on a display screen; and a sensor device 30 which detects the position of a real object on the display screen. The rendering device 10 changes the camera position and renders a predetermined object within the video on the basis of the position of the real object the display screen.

11 Claims, 6 Drawing Sheets

(58) Field of Classification Search
CPC ..... G06T 15/20; G06T 19/006; G06T 19/003; G06T 19/20; G06T 19/00
See application file for complete search history.

(56) References Cited

FOREIGN PATENT DOCUMENTS

| | | | |
|---|---|---|---|
| JP | 2000-232660 A | | 8/2000 |
| JP | 2008-90617 A | | 4/2008 |
| JP | 2009-265853 A | | 11/2009 |
| JP | 2011130966 A | * | 7/2011 |
| JP | 2017-187882 A | | 10/2017 |
| JP | 6276882 B1 | | 1/2018 |

OTHER PUBLICATIONS

Written Opinion of International Patent Application No. PCT/JP2019/007477 completed May 17, 2019 and dated May 28, 2019 (4 pages).
Office Action of Japanese application No. 2018-115602 dated Nov. 25, 2021.
Office Action of Japanese application No. 2018-115602 dated Apr. 19, 2022.
Extended European Search Report for application No. 19822530.2 dated Feb. 3, 2022 (9 pages).

* cited by examiner

VIDEO DISPLAY SYSTEM, VIDEO DISPLAY METHOD, AND COMPUTER PROGRAM

TECHNICAL FIELD

The present invention relates to a video display system, a video display method, and a computer program. More specifically, the present invention relates to a system for rendering a track ("air-writing") in a virtual space.

BACKGROUND ART

As a conventional system for amusement, there is known, for example, a system in which user visible shadow data is generated from infrared imaging data obtained by capturing an image of an infrared shadow projected on a screen, and this visible shadow data is displayed on the screen (PTL 1). According to this system, the shadow of the user can be cast on a video projected on the screen on a floor surface, and a processed image of the shadow can be displayed on the screen in real time.

CITATION LIST

Patent Literature

[PTL 1] Japanese Patent Application Publication 2009-265853

SUMMARY OF INVENTION

Technical Problem

Incidentally, in the system of PTL 1, the shadow of the user is only projected on the display screen on the floor surface, and this system cannot give the user a sense of immersion as if the user entered the video space. Further, in the system of PTL 1, there is a problem that the video of the shadow of the user is only processed and no trace of the user remains in the video space, so that it lacks a sense of presence.

Therefore, it is a main object of the present invention to provide a strong sense of immersion and a strong sense of presence in a display system that changes a video in accordance with the position of a real object on a display screen.

Solution to Problem

As a result of intensive studies on the solution to the above problem, the inventor of the present invention conceived that a video from a camera viewpoint moving in a virtual space is displayed on a display screen, and the position of a real object (e.g., a person) on the display screen is detected so that an object according to the movement of a virtual camera appears within the video based on the position of the real object. This makes it possible to provide a sense of immersion and a sense of presence as if the real object exists in the space projected by the virtual camera. Then, the inventor conceived that the problems of the conventional art would be solved based on the above knowledge, and has made the present invention. Describing it in detail, the present invention has the following configuration and steps.

A first aspect of the present invention relates to a video display system. The system according to the present invention basically includes a rendering device, a display device, and a sensor device. The rendering device generates a two-dimensional video as seen from a specific camera position. The display device displays the video generated by the rendering device on a display screen. The display device may be, for example, a liquid crystal display, an organic EL display, or a projector that projects video light onto a screen. Further, the display screen can be formed on a floor surface or a wall surface. The sensor device detects the position of a real object on the display screen of the display device. The real object may be the whole body of a person, a part of a person such as his/her arm or finger(s), or an article not a person. Then, the rendering device moves the camera position and makes an object appear in the video based on the position of the real object on the display screen. The camera position (i.e., the camera viewpoint) may be two-dimensionally moved and controlled in a planar, two-dimensional virtual space, or may be three-dimensionally or two-dimensionally moved and controlled in a stereoscopic, three-dimensional virtual space. Further, examples of the object may be a track object, which will be described below, or may be various two-dimensional or three-dimensional objects appearing in the virtual space. For example, objects (various things such as glows, petals, and living things) may be generated following the steps of a person located on the display screen.

With the above configuration, the virtual camera is moved in the two-dimensional or three-dimensional video space, and an object is displayed in the video space based on the position of the real object according to the movement of the virtual camera, so that it is possible to provide a sense of immersion as if the real object on the display screen were moving in the video space. In addition, since the object appears based on the position of the real object, it is possible to provide a sense of presence as if the real object were affecting the video space.

In the present invention, it is preferable that when the camera position moves, the rendering device makes a track object appear in the video, the track object extending in the moving direction of the camera position starting from the position of the real object on the display screen. As a result, the track object is rendered in the video space stating from the position of the real object. The track object becomes a digital art work, for example, the user can participate in the production of the work.

In a preferred embodiment of the present invention, the rendering device transforms a three-dimensional space represented by a world coordinate system $(X, Y, Z)$ into a space in a screen coordinate system $(U, V)$ from a specific camera position $(X_c, Y_c, Z_c)$ to generate a two-dimensional video. The display device displays the video generated by the rendering device on a display screen. The sensor device detects the position of a real object on the display screen. Here, the rendering device moves the camera position in the three-dimensional space, and transforms position coordinates $(U_O, V_O)$ of the real object on the display screen into spatial coordinates $(X_O, Y_O, Z_O)$ in the three-dimensional space. Then, the rendering device creates an object in the three-dimensional space based on the spatial coordinates.

With the above configuration, rendering the video in the three-dimensional space on the display screen while moving the camera position makes it possible to provide a higher sense of immersion as if the real object on the display screen were floating in the three-dimensional space. In addition, in case that a real object is located on the display screen, reflecting the position coordinates of a real object into the three-dimensional space to generate an object in that space makes it possible to provide a sense of presence as if the real object were influencing the three-dimensional space. This makes it possible to generate a more powerful video in real time.

In the present invention, the rendering device preferably includes a camera control unit and an object generation unit. The camera control unit controls the movement of the camera position. When the spatial coordinates ($X_O$, $Y_O$, $Z_O$) of the real object in the three-dimensional space change, the object generation unit generates a track object connecting the spatial coordinates before and after the change in three-dimensional space. In the present invention, the spatial coordinates of the real object in the three-dimensional space change due to the movement of the camera position or the movement of the real object, and at that time, the track object is generated so as to connect the spatial coordinates before and after the change. As a result, the stereoscopic track object is rendered in the three-dimensional space starting from the position of the real object. The track object in the three-dimensional space becomes a digital art work called "air-writing", and for example, the user can participate in the production of the work.

In the present invention, the camera control unit of the rendering device may control the virtual camera to move in the three-dimensional space about the camera position as a fulcrum of rotation. Moving the virtual camera about the camera position as the fulcrum of rotation causes the screen coordinate system (U, V) to move greatly in the virtual space, so that it is possible to create a dynamic "air-writing".

In the present invention, the camera control unit of the rendering device may move the camera position such that the spatial coordinates ($X_O$, $Y_O$, $Z_O$) of the real object in the three-dimensional space change along a predetermined track. The predetermined track is, for example, a track for rendering characters, figures, symbols, and the like. This makes it possible to render a predetermined character or the like in the three-dimensional space.

In the present invention, for example, when a character is rendered in the three-dimensional space, the camera control unit of the rendering device can control the virtual camera to move in the three-dimensional space about the spatial coordinates ($X_O$, $Y_O$, $Z_O$) of the real object in the three-dimensional space as a fulcrum of rotation. As described above, it is possible to control the movement of the virtual camera about the camera position as the fulcrum of rotation. However, if the fulcrum of rotation is used as the camera position to render a character and the like in the three-dimensional space, it would be difficult to render the character and the like. Therefore, a mode of freely rendering a track and a mode of rendering characters and the like are prepared, and it is preferable that in the latter mode, the virtual camera is moved about the spatial coordinates of the real object in the three-dimensional space as a fulcrum of rotation.

In the present invention, for example, when a plurality of real objects is located on the display screen, the camera control unit preferably moves the camera position such that the spatial coordinates ($X_O$, $Y_O$, $Z_O$) of the real object closest to a specific point on the display screen in the three-dimensional space change along a predetermined track. As the specific point on the display screen, the center point of the screen may be set, or another point may be set. If the real object on the display screen is, for example, a person, the person may disappear from the display screen before the rendering of a character or the like in the three-dimensional space is completed. Therefore, when a character or the like is rendered in the three-dimensional space, instead of rendering starting from the position of a specific person, rendering starting from a person who is near a specific point on the display screen makes it possible to complete the rendering of the predetermined character and the like even when a specific person disappears from the display screen.

In the present invention, it is preferable that the display device displays a video on a floor surface, and the sensor device detects the standing position of a person on the floor surface. This way, that is, displaying a three-dimensional space video on the floor surface and moving the camera position from which the video is captured, makes it possible to give a person standing on the screen a sense as if the person were floating in the three-dimensional space. In addition, since the track object is rendered in the three-dimensional space starting from the standing position of the person, the person can participate in the production of the art work.

A second aspect of the present invention relates to a video display method. In the video display method according to the present invention, first, a rendering device generates a two-dimensional video as seen from a specific camera position. Further, a display device displays the video on a display screen. Further, a sensor device detects the position of a real object on the display screen. Furthermore, the rendering device moves the camera position and makes an object appear in the video based on the position of the real object on the display screen.

In a preferred embodiment of the video display method according to the present invention, first, the rendering device transforms a three-dimensional space represented by a world coordinate system (X, Y, Z) into a space in a screen coordinate system (U, V) from a specific camera position to generate a two-dimensional video. Further, the display device displays the video generated by the rendering device on a display screen. Further, the sensor device detects the position of a real object on the display screen. Furthermore, the rendering device moves the camera position in the three-dimensional space, and transforms position coordinates ($U_O$, $V_O$) of the real object on the display screen into spatial coordinates ($X_O$, $Y_O$, $Z_O$) in the three-dimensional space to generate an object in the three-dimensional space based on the spatial coordinates.

A third aspect of the present invention relates to a computer program. The computer program according to the present invention causes a computer to function as the rendering device of the video display system according to the first aspect described above.

Advantageous Effects of Invention

According to the present invention, it is possible to provide a strong sense of immersion and a strong sense of presence in a display system that changes a video in accordance with the position of a real object on a display screen.

DESCRIPTION OF EMBODIMENT(S)

An embodiment of the present invention will be described below with reference to the drawings. The present invention is not limited to the embodiment described below, and includes any modifications of the following embodiment as appropriate in the scope obvious to those skilled in the art.

Figure 1:
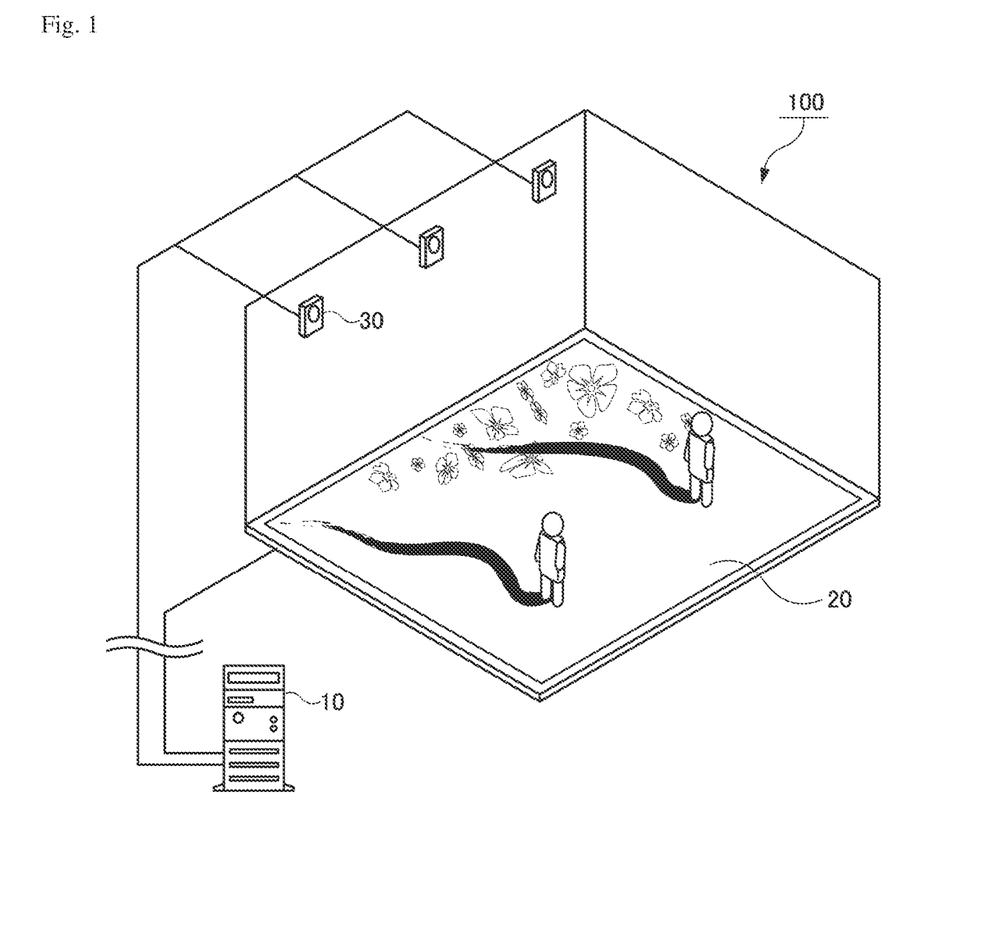
FIG. 1 is an overall view illustrating the configuration of a video display system.

FIG. 1 illustrates an overall view of a video display system 100 according to the present invention. As illustrated in FIG. 1, the video display system 100 includes a rendering device 10, a display device 20, and a sensor device 30. The rendering device 10 is a computer for managing and controlling the entire system and for generating a video to be displayed on the display device 20. The display device 20 is a display for displaying a video under the control of the rendering device 10. In the present embodiment, the display device 20 is arranged on a floor surface so that a person can stand on the display device 20. The sensor device 30 is a sensor for detecting the position of a real object (particularly, a person) on a display screen of the display device 20. In the present embodiment, the sensor device 30 is an optical sensor, and one or more sensor devices 30 are attached to a wall surface surrounding the display screen. The sensor device 30 irradiates the display screen with infrared rays or the like to detect the position of the real object on the display screen. As illustrated in FIG. 1, according to this system, for example, it is possible to display a track object extending in a predetermined direction starting from the position of a person on the display screen. The configuration of this system will be described in detail below.

FIG. 1 illustrates an example of a functional configuration of the video display system 100. The rendering device 10 is connected to the display device 20 and the sensor device(s) 30 by wire or wirelessly, and has a function of generating a video to be displayed on the display device 20 according to information detected by the sensor device(s) 30. The rendering device 10 may be realized by one computer or may be constructed by a plurality of computers. In a case where the rendering device 10 is composed of a plurality of computers, each computer may be connected by wire or wirelessly, and may be connected via a network such as the Internet. The rendering device 10 basically includes a rendering processing unit 11 and a storage unit 12.

The rendering processing unit 11 is a device for rendering a video to be displayed on the display device 20, and is configured to include a processor such as a CPU (Central Processing Unit) or a GPU (Graphics Processing Unit), for example. The rendering processing unit 11 reads an application program (computer program) stored in the storage unit 12 and performs a predetermined rendering process in accordance with the application program. The rendering processing unit 11 can also write and read the results of the rendering process and the progress thereof in the storage unit 12 as appropriate. Details of the functional blocks constituting the rendering processing unit 11 will be described below.

The storage unit 12 is an element for storing various information used for the rendering process and the like in the rendering processing unit 11. Specifically, the storage unit 12 stores an application program that causes a general-purpose computer to function as the rendering device 10 of the video display control system 100 according to the present invention. The storage function of the storage unit 12 can be realized by a nonvolatile memory such as an HDD and an SSD. Further, the storage unit 12 may have a function as a memory for writing or reading, for example, the progress of the arithmetic processing of the rendering processing unit 11. The memory function of the storage unit 12 can be realized by a volatile memory such as a RAM or a DRAM.

The display device 20 is a display for displaying a video generated by the rendering device 10. As the display, a known one such as a liquid crystal display or an organic EL display can be adopted. In a case where a display large enough to enable a person to stand is provided as illustrated in FIG. 1, a plurality of display panels may be arranged in an array, or one large panel may be used. Further, in the present invention, the display device 20 is not limited to such a floor display, and may be a display hung on the wall surface. Further, the display device 20 is not limited to a display type of device, and may be, for example, a projector that projects video light onto a screen provided on the floor surface or the wall surface. However, for a projector, there is a high possibility that the shadow of a person will be reflected on the display screen for video, and the track object generated by the rendering device 10 may be difficult to see. Therefore, in the present invention, it is preferable to use a display type of device as the display device 20.

The sensor device 30 is a sensor for detecting the position of a real object (particularly, a person) on the display screen (real space) on which the display device 20 displays a video. For the display device 20 being a display, the "display screen" means a surface on the display. Further, for the display device 20 being a projector, the "display screen" means a projection surface (screen surface) for video. As the sensor device 30, a known sensor capable of detecting the position of a real object in the real space can be used. For example, a pressure-sensitive sensor, a heat-sensitive sensor, an ultrasonic sensor, and a capacitive sensor, as well as an optical sensor can be used. In the example illustrated in FIG. 1, an optical sensor is used as the sensor device 30. A plurality of optical sensors is mounted on the wall surface or ceiling, the display screen is irradiated with infrared rays from the optical sensors, and the reflected light is received, so that the position of a person or the like on the display screen can be identified. Also, a transparent pressure-sensitive sensor is provided on the display, and the pressure-sensitive point when a person stands on the display is detected, so that the position of the person on the display screen can be identified. Further, in a case where the display is provided on the wall surface, a capacitive touch sensor may be provided on the front surface of the display. In this way, the method of detecting the position of a real object on the display screen is not particularly limited, and a known method can be adopted as appropriate.

Figure 2:
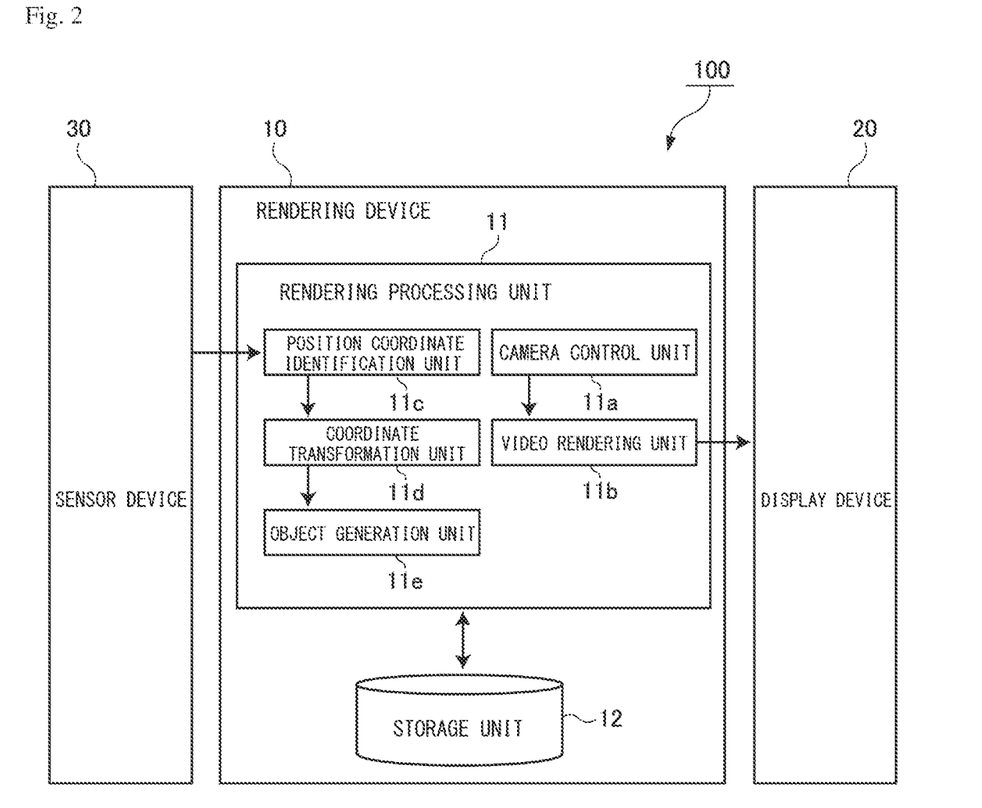
FIG. 2 is a block diagram illustrating a functional configuration example of the video display system.
Figure 3:
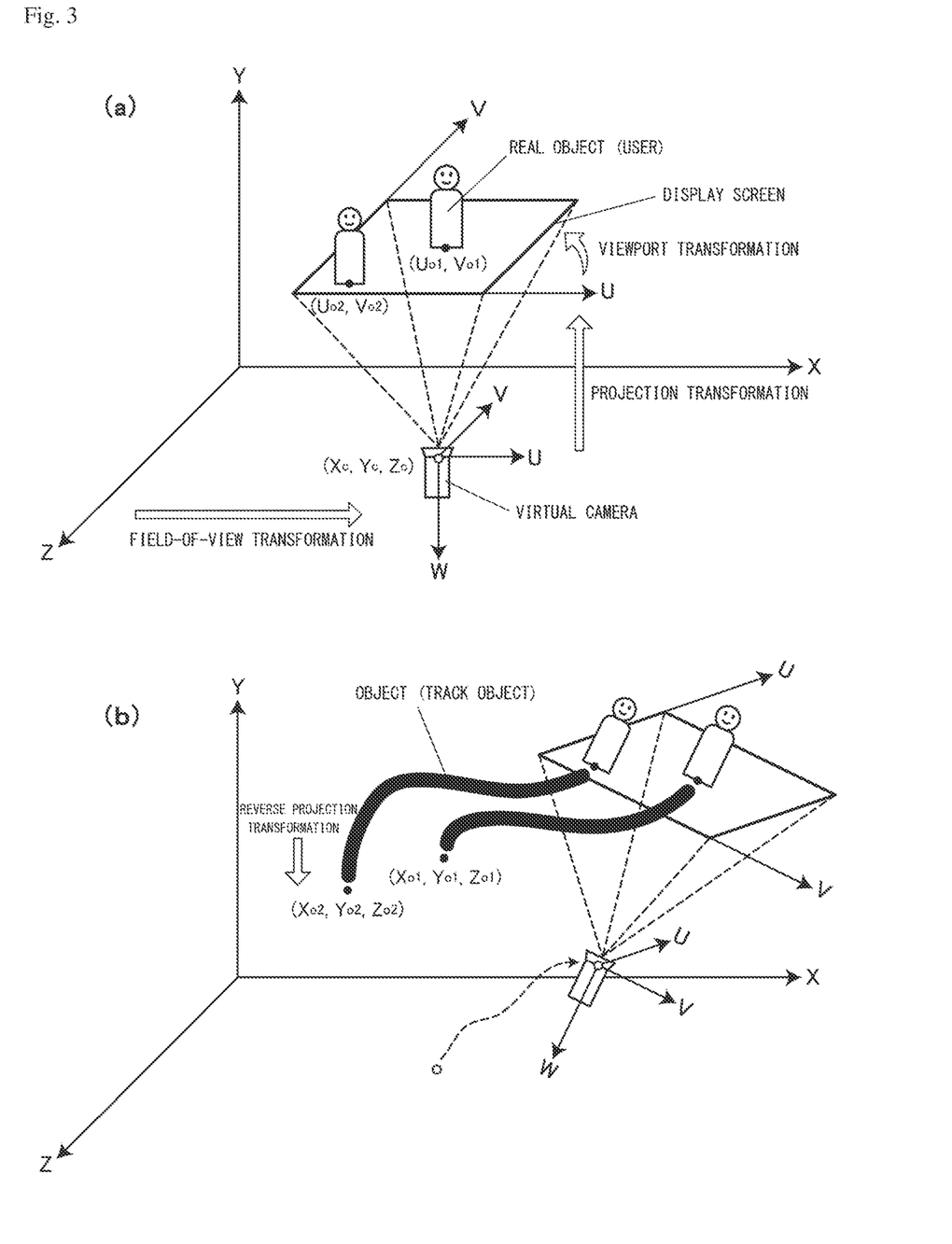
FIG. 3 is a schematic diagram illustrating an outline of rendering processing in a rendering device.

Subsequently, details of the video rendering process performed by the rendering processing unit 11 will be described with reference to FIGS. 2 and 3. As illustrated in FIG. 2, the rendering processing unit 11 basically includes a camera control unit 11a and a video rendering unit 11b. As illustrated in FIG. 3, the camera control unit 11a controls the movement of the camera viewpoint of a virtual camera in a three-dimensional virtual space represented by a world coordinate system (X, Y, Z). The video rendering unit 11b renders a video in the three-dimensional virtual space captured from the viewpoint of the virtual camera. Accordingly, the video of the three-dimensional virtual space captured from the viewpoint of the virtual camera is displayed on the display device 20, and the video displayed on the display device 20 also changes by the movement of the viewpoint of the virtual camera.

Specifically, the world coordinate system has an X-axis, a Y-axis, and a Z-axis, which are orthogonal to each other. The world coordinate system (X, Y, Z) specifies coordinate points in a three-dimensional virtual space. Various three-dimensional objects (e.g., track objects) are rendered in the three-dimensional virtual space, and the coordinates of these three-dimensional objects are specified in the world coordinate system. Further, the virtual camera in the world coordinate system has a unique camera coordinate system (U, V, W). Note that the position coordinates of the virtual camera are specified in the world coordinate system. In the camera coordinate system (U, V, W), the horizontal direction is the U axis, the vertical direction is the V axis, and the depth direction is the W axis, as seen from the virtual camera. These U-axis, V-axis, and W-axis are orthogonal to each other. The position of the virtual camera corresponds to the origin ($X_c$, $Y_c$, $Z_c$) of the camera coordinates in the world coordinate system. The direction of the virtual camera corresponds to the direction of each coordinate axis (U-axis, V-axis, W-axis) of the camera coordinates in the world coordinate system. The coordinates in the camera coordinate system can be obtained by field-of-view transformation (geometric transformation) of the coordinates in the world coordinate system. Specifically, in the field-of-view transformation, the video rendering unit 11b performs coordinate transformation for obtaining a video as seen from the camera position in the world coordinate system.

Further, the two-dimensional range of a screen to be captured by the virtual camera is a screen coordinate system (U, V). The screen coordinate system is a coordinate system that defines a two-dimensional plane to be displayed on the display device 20 such as a display or a projector. The screen coordinate system (U, V) corresponds to the U-axis and V-axis of the camera coordinate system. Coordinates in the screen coordinate system (U, V) can be obtained by projection transformation (perspective transformation) of the coordinates in the camera coordinate system captured by the virtual camera. Specifically, in the projection transformation, the video rendering unit 11b performs coordinate transformation for projecting a three-dimensional object represented in the world coordinate system onto the two-dimensional screen coordinate system. Further, the video rendering unit 11b performs viewport transformation for displaying the two-dimensional video projected onto the screen coordinate system in the display screen (viewport) of the display device 20. As a result, the video rendering unit 11b can generate a video to be displayed on the display device 20.

In this way, the video rendering unit 11b performs the field-of-view transformation, projection transformation, and viewport transformation with respect to the coordinate points in the three-dimensional space in accordance with the position and direction of the virtual camera whose movement is controlled by the camera control unit 11a, so that it is possible to render a two-dimensional video to be displayed on the display screen of the display device 20.

Further, as illustrated in FIG. 2, in addition to the camera control unit 11a and the video rendering unit 11b, the rendering processing unit 11 of the rendering device 10 includes a position coordinate identification unit 11c, a coordinate transformation unit 11d, and an object generation unit 11e. Each of these elements 11c, 11d, 11e has a function for generating a track object in the three-dimensional virtual space in accordance with the position of a real object on the display screen.

FIG. 3(a) schematically illustrates a state where a real object (user) is located on the display screen of the display device 20. First, the position coordinate identification unit 11c identifies the position coordinates of the real object on the display screen based on sensing information from the sensor device 30 described above. Specifically, since the sensor device 30 detects the position of the real object in the real space where the display device 20 is arranged, the position coordinate identification unit 11c can use the sensing information of the sensor device 30 to identify the position coordinates on the display screen of the display device 20. The position coordinates of the real object are represented as a coordinate point ($U_O$, $V_O$) in the screen coordinate system. For example, in the example illustrated in FIG. 3, two users are located on the display screen, and their respective position coordinates are represented by ($U_{O1}$, $V_{O1}$) and ($U_{O2}$, $V_{O2}$).

Then, the coordinate transformation unit 11d performs a coordinate transformation process of transforming the position coordinates ($U_O$, $V_O$) of the real object in the screen coordinate system identified by the position coordinate identification unit 11c into spatial coordinates ($X_O$, $Y_O$, $Z_O$) in the world coordinate system. Specifically, since three-dimensional coordinates in the world coordinate system can be transformed into two-dimensional coordinates in the screen coordinate system by performing the field-of-view transformation and the projection transformation as described above, the coordinate transformation unit 11d can perform the reverse procedure and calculation to transform two dimensional coordinates (position coordinates $U_O$, $V_O$ of the real object) in the screen coordinate system into three-dimensional coordinates (real object space coordinates $X_O$, $Y_O$, $Z_O$) in the world coordinate system. Such a reverse coordinate transformation is referred to as a "reverse projection transformation" herein. In the example illustrated in FIG. 3, two users are located on the display screen, and their respective position coordinates in the screen coordinate system are represented by ($U_{O1}$, $V_{O1}$) and ($U_{O2}$, $V_{O2}$). Therefore, the coordinate transformation unit 11d performs the reverse projection transformation on these position coordinates, and performs an arithmetic process to obtain spatial coordinates ($X_{O1}$, $Y_{O1}$, $Z_{O1}$) and ($X_{O2}$, $Y_{O2}$, $Z_{O2}$) in the world coordinate system from the position coordinates of the respective users.

As described above, the coordinate transformation unit 11d repeats the process of transforming the position coordinates ($U_O$, $V_O$) of the real object into the spatial coordinates ($X_O$, $Y_O$, $Z_O$). Here, when the position coordinates ($U_O$, $V_O$) of the real object changes, or when the position coordinates ($X_c$, $Y_c$, $Z_c$) of the virtual camera in the three-dimensional virtual space change, the spatial coordinates ($X_O$, $Y_O$, $Z_O$) of the real object also change accordingly. In other words, for example, when the user moves on foot on the display screen in the real space, the spatial coordinates ($X_O$, $Y_O$, $Z_O$) of the user in the three-dimensional virtual space also change according to the position coordinates ($U_O$, $V_O$) of the user. In addition, even if the user is stationary on the display screen in the real space, when the position coordinates ($X_c$, $Y_c$, $Z_c$) of the virtual camera change in the three-dimensional virtual space, the spatial coordinates ($X_O$, $Y_O$, $Z_O$) of the user in the three-dimensional virtual space also change according to the position coordinates of the virtual camera. In this way, the coordinate transformation unit 11d calculates the spatial coordinates of the user that change at any time in real time, and stores the changing spatial coordinates with time in the storage unit 12.

Next, the object generation unit 11e generates a predetermined object in three-dimensional virtual space based on the spatial coordinates ($X_O$, $Y_O$, $Z_O$) of the real object (user)

obtained by the coordinate transformation unit 11d. Specifically, as illustrated in FIG. 3(b), it is preferable that when the spatial coordinates ($X_O$, $Y_O$, $Z_O$) of the real object change with time, the object generation unit 11e generates a track object to connect the spatial coordinates before and after the change in the three-dimensional space. In the example illustrated in FIG. 3(b), the spatial coordinates of the real object change according to changes in the position of the virtual camera in the three-dimensional virtual space, and the track object following the track of the changes is generated.

Note that the object to be generated by the object generation unit 11e is not limited to the track object described above, and can generate various effect objects based on the spatial coordinates of the real object. For example, petals, vegetation, animals, glows, shadows, ripples, and the like may be displayed following the steps of the user as the virtual camera moves, or the color of the steps of the user may change. The effect of such an object can be appropriately designed according to the situation.

Figure 4:
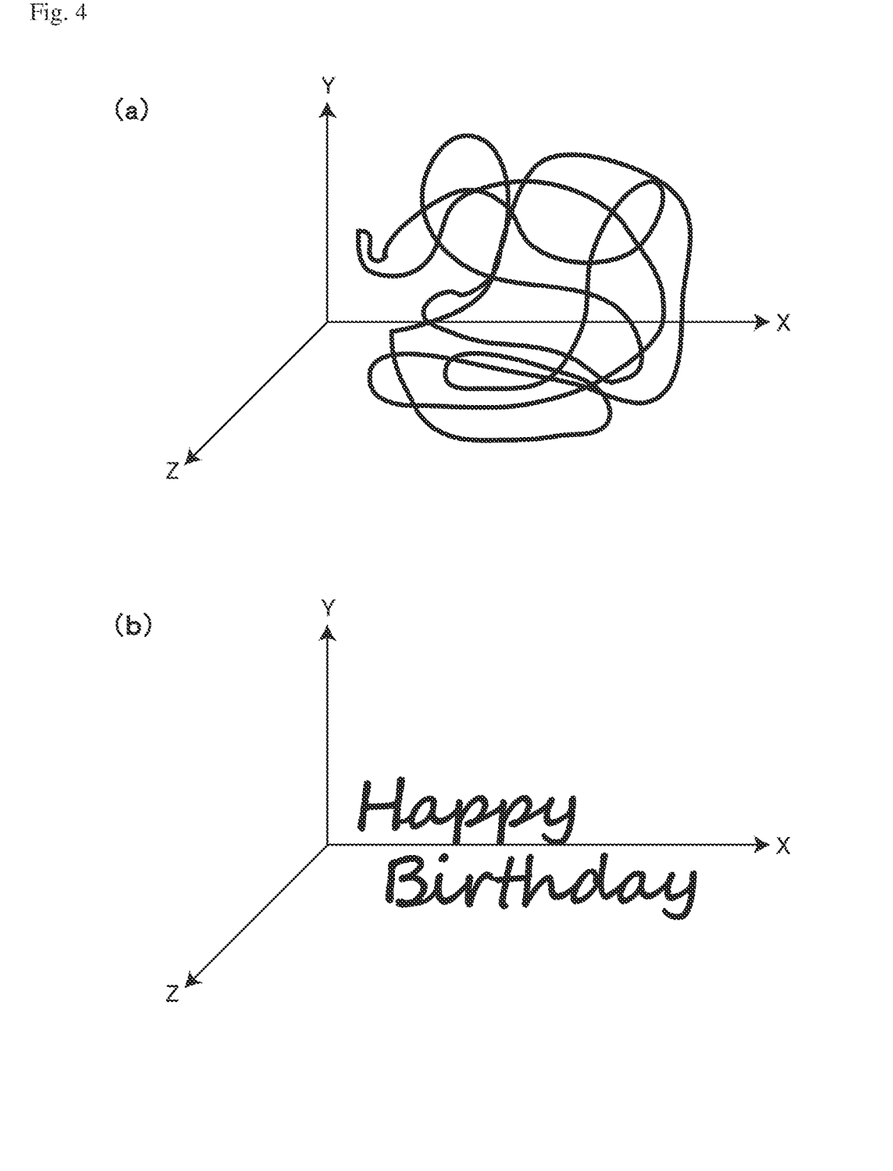
FIG. 4 illustrates an example of a track object generated in a three-dimensional space.

FIG. 4 illustrates an example of an object generated by the object generation unit 11e. FIG. 4(a) illustrates an example in which a track object is freely formed in the three-dimensional virtual space in accordance with the position of the real object on the display screen. In this case, the camera control unit 11a may control the virtual camera to move randomly in the three-dimensional virtual space. Further, the camera control unit 11a may control the virtual camera to move in the dimensional virtual space along a predetermined movement path. Even if the movement path of the virtual camera is defined, since the position of the user (real object) on the display screen is random, a track object having a random shape is created in the three-dimensional virtual space.

FIG. 4(b) illustrates an example in which predetermined characters are rendered by a track object in the three-dimensional virtual space. Specifically, in the example illustrated in FIG. 4(b), a track object corresponding to the characters "Happy Birthday" is created. In this case, the camera control unit 11a controls the position and direction of the virtual camera so that the spatial coordinates of the real object in the three-dimensional virtual space trace the predetermined characters and change accordingly. Note that It is possible not only to render characters with a track object, but also to render predetermined numbers, symbols, character outlines, and the like. After the track object forming characters or the like is completed, the characters can be clearly displayed on the display screen of the display device 20 by capturing them from the front side with the virtual camera.

Figure 5:
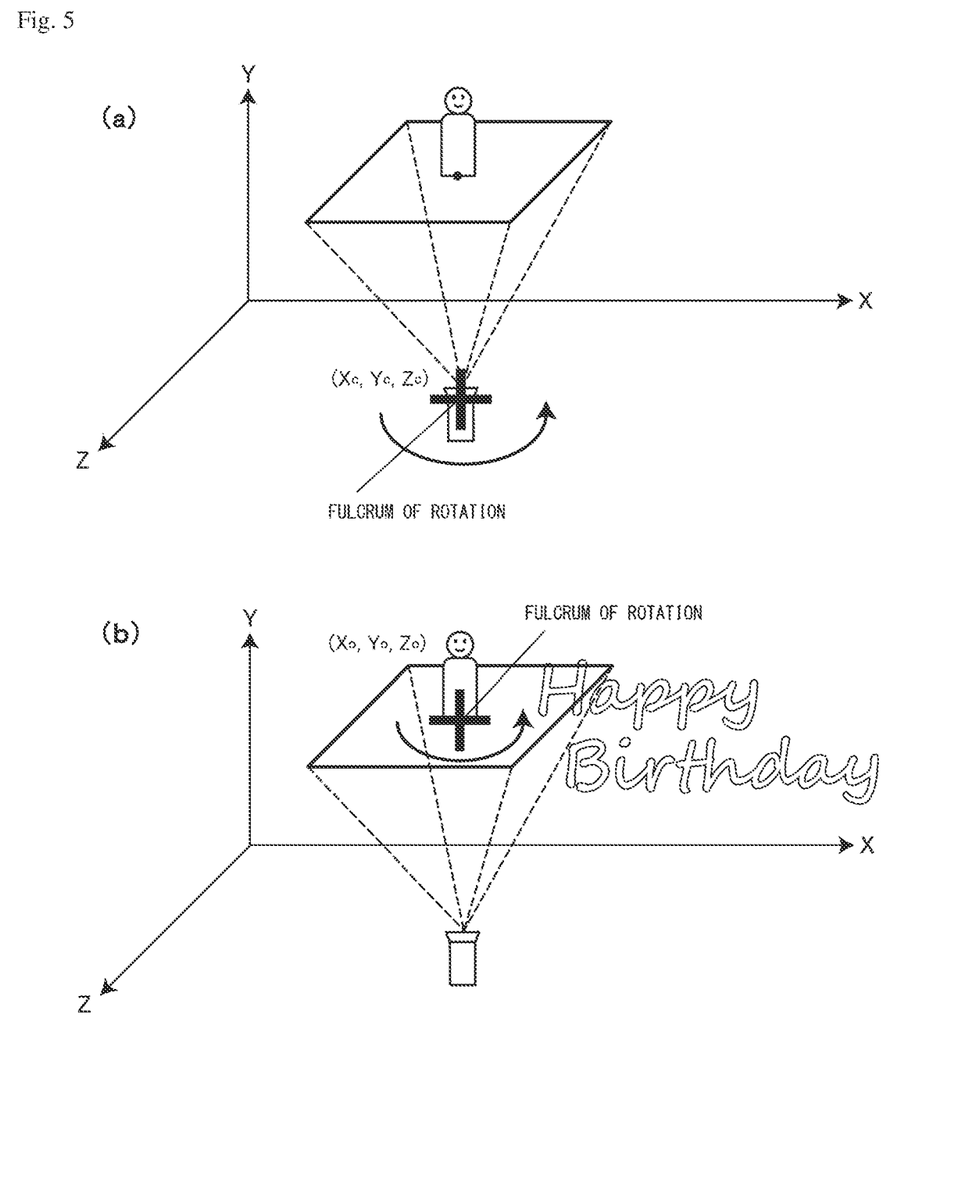
FIG. 5 illustrates an example of a fulcrum of rotation for a virtual camera.

FIG. 5 illustrates a control example of the virtual camera in the three-dimensional virtual space. As illustrated in FIG. 5(a), the camera control unit 11a may control the movement of the virtual camera about the viewpoint ($X_c$, $Y_c$, $Z_c$) of the virtual camera as a fulcrum of rotation. In that case, just moving the virtual camera a little result in significant movement of the display screen in the virtual space, so it is possible to generate a dynamic track object. Therefore, such a control mode of the virtual camera is suitable for generating a free track object as illustrated in FIG. 4(a).

Further, as illustrated in FIG. 5(b), the camera control unit 11a may control the movement of the virtual camera about the space coordinates ($X_O$, $Y_O$, $Z_O$) of the real object in the three-dimensional space as a fulcrum of rotation. Since the spatial coordinates of the real object become a starting point of the track object, the shape of the track object can be controlled more accurately. Therefore, such a control mode of the virtual camera is suitable for generating a predetermined track object such as characters as illustrated in FIG. 4(b).

Figure 6:
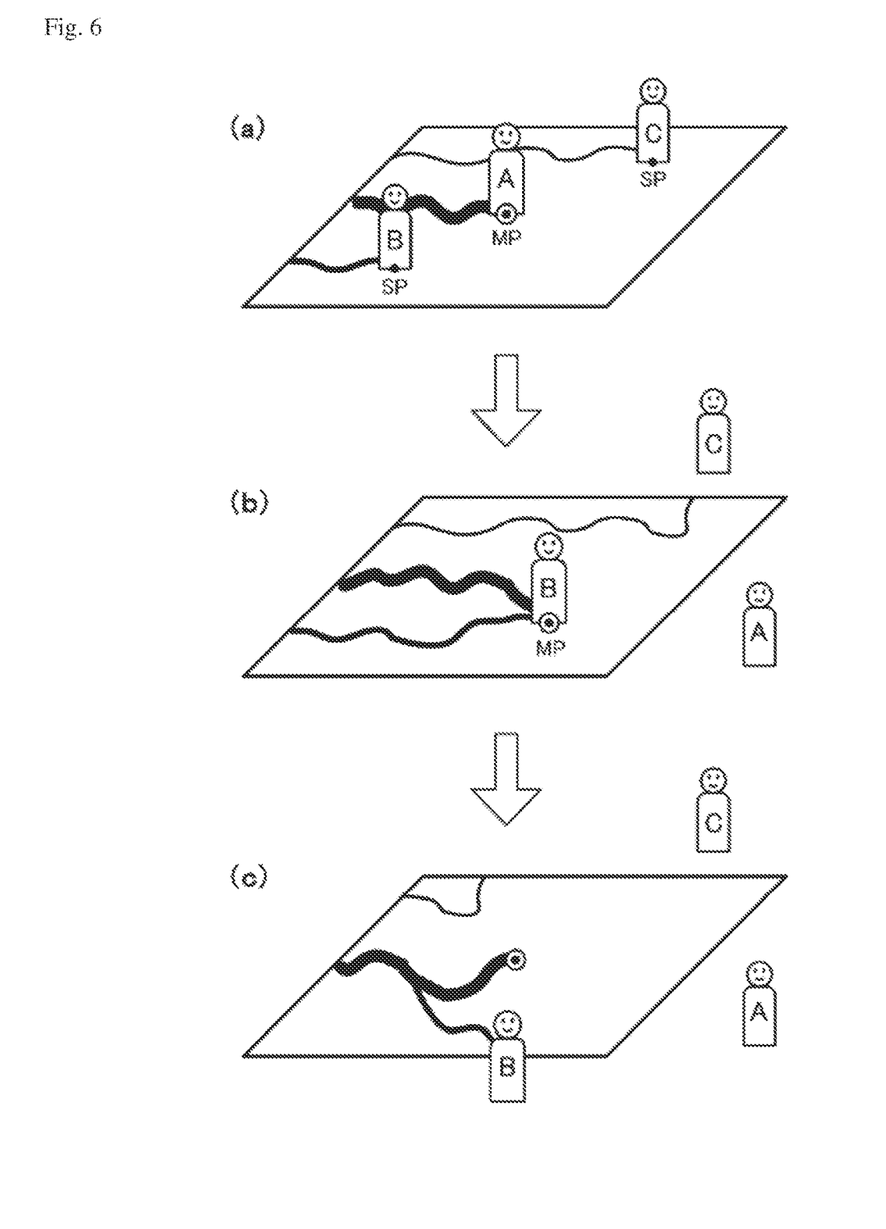
FIG. 6 illustrates the concept of a main player and a sub player.

FIG. 6 illustrates an example of a rendering process for a plurality of real objects existing on the display screen. For example, as illustrated in FIG. 4(b), assuming that a track object for rendering predetermined characters is generated in the three-dimensional virtual space, for a plurality of real objects existing on the display screen, it is necessary to determine a real object on the display screen that is to be the starting point of the track of the characters. In that case, for example, one real object (person) closest to the center on the display screen can be set as a main player (MP), the other real objects can be set as sub players (SPs), and the virtual camera can be controlled so that the spatial coordinates of the main player in the three-dimensional space follow the track of the predetermined characters. In FIG. 6(a), a person A is set as the main player, and the other people B and C are set as the sub players. On the other hand, as illustrated in FIG. 6(b), when the person A originally set as the main player moves away from the display screen and the person closest to the center on the display screen becomes the person B, the main player can be switched from the person A to the person B. Further, as illustrated in FIG. 6(b), when there is no real object on the display screen, a track object can be generated from the spatial coordinates of the center on the display screen as a base point. In this way, it is possible to complete to generate a track object for rendering a predetermined character in any of the cases where there is a plurality of real objects on the display screen, where a real object moves, and where a real object disappears from the display screen. Therefore, it is possible to avoid a situation in which the track object remains incomplete.

As described above, in this specification, the embodiment of the present invention has been described with reference to the drawings in order to express the contents of the present invention. However, the present invention is not limited to the above-described embodiment, but includes modifications and improvements obvious to those skilled in the art based on the matters described in this specification.

In this specification, the embodiment has been mainly described in which a virtual camera is moved three-dimensionally in a three-dimensional virtual space and a stereoscopic track object is generated in the three-dimensional virtual space. However, the present invention is not limited to such an embodiment. For example, a virtual camera may be moved two-dimensionally in a three-dimensional virtual space to generate a planar track object, and a character may be generated by the track object. Further, a virtual camera may be moved two-dimensionally in a three-dimensional virtual space to generate a planar track object.

INDUSTRIAL APPLICABILITY

The present invention relates to a video display system and a method for creating a digital art work called "air-writing". Therefore, the present invention can be suitably used in the digital art industry and the entertainment industry.

REFERENCE SIGNS LIST

100 Video display system
10 Rendering device
11 Rendering processing unit
11a Camera control unit
11b Video rendering unit 11c Position coordinate identification unit
11d Coordinate transformation unit
11e Object generation unit
12 Storage unit
20 Display device
30 Sensor device

The invention claimed is:

1. A video display system comprising:
   a processor that generates a two-dimensional video as seen from a camera position of a virtual camera in a virtual space;
   a display device that displays the video on a display screen; and
   a sensor device that detects a position of a real object on the display screen, wherein
   the processor moves the camera position,
   the processor makes an object appear in the video based on the position of the real object on the display screen according to movement of the camera position,
   the display device displays the video on a floor surface, and
   the sensor device detects a standing position of a person on the floor surface as the position of the real object on the display screen;
   wherein
   when the camera position moves, the processor makes a track object appear in the video, the track object extending in a moving direction of the camera position starting from the position of the real object on the display screen.

2. A non-transitory storage medium storing a computer program for causing a computer to function as the processor of the video display system according to claim 1.

3. A video display system comprising:
   a processor that generates a two-dimensional video as seen from a camera position of a virtual camera in a virtual space;
   a display device that displays the video on a display screen; and
   a sensor device that detects a position of a real object on the display screen, wherein
   the processor moves the camera position,
   the processor makes an object appear in the video based on the position of the real object on the display screen according to movement of the camera position,
   the display device displays the video on a floor surface, and
   the sensor device detects a standing position of a person on the floor surface as the position of the real object on the display screen;
   wherein
   the processor transforms a three-dimensional virtual space represented by a world coordinate system $(X, Y, Z)$ into a space in a screen coordinate system $(U, V)$ from the camera position to generate the two-dimensional video, and
   the processor further moves the camera position in the three-dimensional virtual space, and transforms position coordinates $(U_O, V_O)$, which is defined by the screen coordinate system $(U, V)$, of the real object on the display screen into spatial coordinates $(X_O, Y_O, Z_O)$ in the three-dimensional virtual space to generate the object in the three-dimensional virtual space based on the spatial coordinates.

4. The video display system according to claim 3, wherein the processor
   controls movement of the camera position; and
   generates, when the spatial coordinates $(X_O, Y_O, Z_O)$ of the real object in the three-dimensional virtual space change, a track object connecting the spatial coordinates before and after the change in the three-dimensional virtual space.

5. The video display system according to claim 4, wherein the processor controls the virtual camera to move in the three-dimensional virtual space about the camera position as a fulcrum of rotation.

6. The video display system according to claim 4, wherein the processor moves the camera position such that the spatial coordinates $(X_O, Y_O, Z_O)$ of the real object in the three-dimensional virtual space change along a predetermined track.

7. The video display system according to claim 6, wherein the processor controls the virtual camera to move in the three-dimensional virtual space about the spatial coordinates $(X_O, Y_O, Z_O)$ of the real object in the three-dimensional virtual space as a fulcrum of rotation.

8. The video display system according to claim 6, wherein when a plurality of real objects is located on the display screen, the processor moves the camera position such that the spatial coordinates $(X_O, Y_O, Z_O)$ of the real object closest to a specific point on the display screen in the three-dimensional virtual space change along a predetermined track.

9. A non-transitory storage medium storing a computer program for causing a computer to function as the processor of the video display system according to claim 3.

10. A video display method comprising the steps of:
    generating, by a processor, a two-dimensional video as seen from a camera position of a virtual camera in a virtual space;
    displaying, by a display device, the video on a display screen;
    detecting, by a sensor device, a position of a real object on the display screen;
    moving, by the processor, the camera position; and
    making, by the processor, an object appear in the video based on the position of the real object on the display screen according to movement of the camera position, wherein
    the display device displays the video on a floor surface,
    the sensor device detects a standing position of a person on the floor surface as the position of the real object on the display screen; and
    when the camera position moves, the processor makes a track object appear in the video, the track object extending in a moving direction of the camera position starting from the position of the real object on the display screen.

11. A video display method comprising the steps of:
    generating, by a processor, a two-dimensional video as seen from a camera position of a virtual camera in a virtual space;
    displaying, by a display device, the video on a display screen;
    detecting, by a sensor device, a position of a real object on the display screen;
    moving, by the processor, the camera position; and
    making, by the processor, an object appear in the video based on the position of the real object on the display screen according to movement of the camera position, wherein
    the display device displays the video on a floor surface, the sensor device detects a standing position of a person on the floor surface as the position of the real object on the display screen, the processor transforms a three-dimensional virtual space represented by a world coordinate system $(X, Y, Z)$ into a space in a screen coordinate system $(U, V)$ from the camera position to generate the two-dimensional video, and the processor further moves the camera position in the three-dimensional virtual space, and transforms position coordinates $(U_O, V_O)$, which is defined by the screen coordinate system $(U, V)$, of the real object on the display screen into spatial coordinates $(X_O, Y_O, Z_O)$ in the three-dimensional virtual space to generate the object in the three-dimensional virtual space based on the spatial coordinates.

\* \* \* \* \*